United States Patent [19]

Arbit et al.

[11]  4,265,960

[45]  May 5, 1981

[54] FILMS PRODUCED FROM LDPE ENCAPSULATED CACO$_3$

[75] Inventors: Harold A. Arbit, Highland Park; Harold G. Tinger, Wayne, both of N.J.

[73] Assignee: Mobil Oil Corporation, New York, N.Y.

[21] Appl. No.: 973,366

[22] Filed: Dec. 26, 1978

[51] Int. Cl.$^3$ .............................................. B32B 27/32
[52] U.S. Cl. ................................. 428/220; 260/42.14; 260/42.46; 428/144; 428/330
[58] Field of Search .......................... 260/42.46, 42.14; 428/220, 330

[56] References Cited

U.S. PATENT DOCUMENTS

| | | |
|---|---|---|
| 3,758,661 | 9/1973 | Yamamota et al. .......... 260/42.46 X |
| 3,844,865 | 10/1974 | Elton et al. ...................... 428/330 X |
| 3,876,735 | 4/1975 | Bontinck et al. ............. 260/42.46 X |
| 3,992,558 | 11/1976 | Smith-Johnson et al. ...... 427/221 X |

*Primary Examiner*—Sandra M. Person
*Assistant Examiner*—Lewis T. Jacobs
*Attorney, Agent, or Firm*—Charles A. Huggett; James A. Powers, Jr.; Hastings S. Trigg

[57] ABSTRACT

Fine particle size CaCO$_3$ is encapsulated with low density polyethylene (LDPE) in a fluid energy mill. Very thin extrusion oriented films (as low as 0.4 mil.) were made using the LDPE encapsulated CaCO$_3$ at high concentrations of 32–61%. Such films are soft and have a dry "feel" and translucent appearance with slip and anti-block properties. They can be heat sealed, printed, and folded. The films can be used as paper and paper tissue substitutes.

1 Claim, 1 Drawing Figure

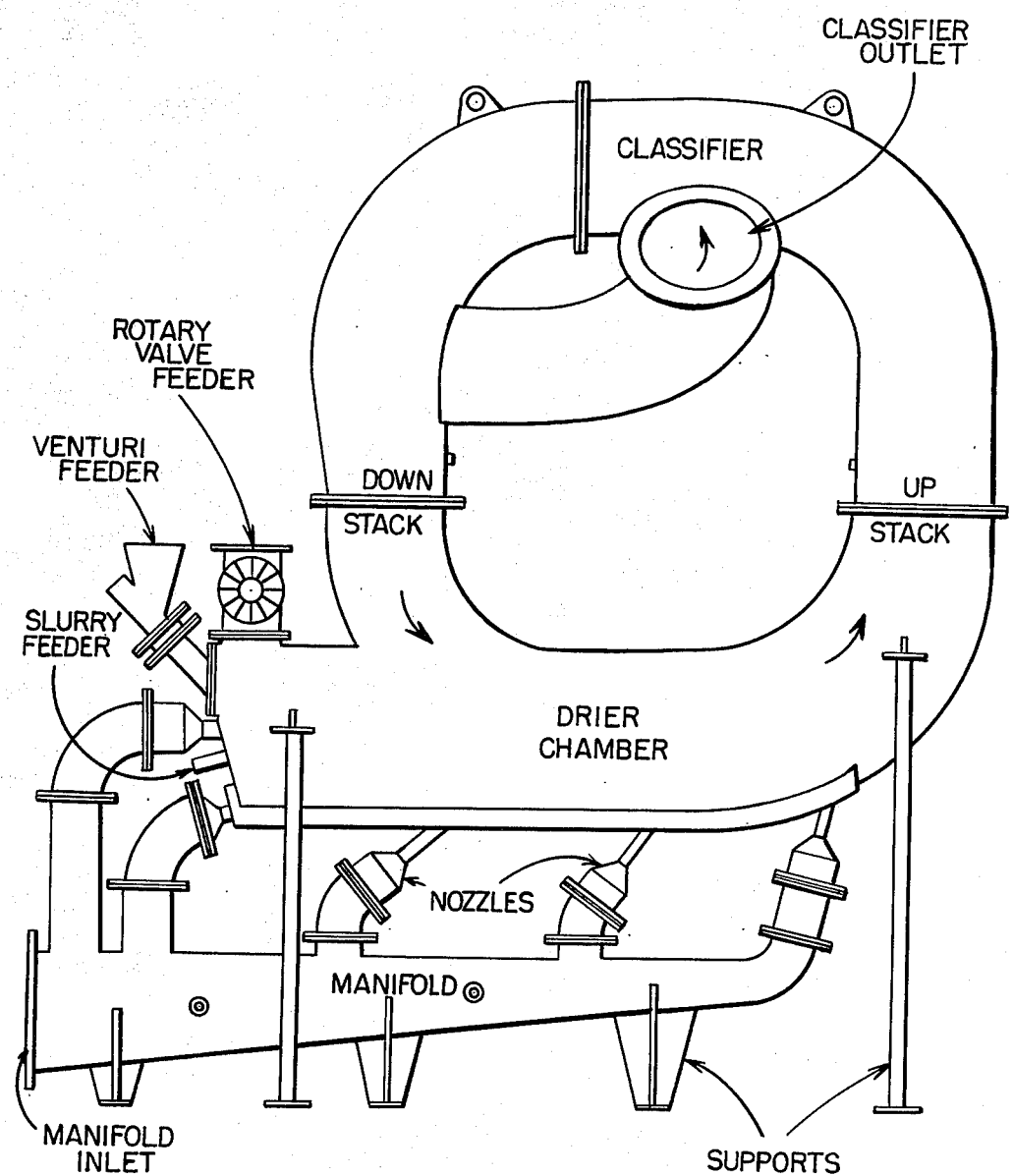

FILMS PRODUCED FROM LDPE ENCAPSULATED CACO₃

FIELD OF THE INVENTION

This invention is concerned with $CaCO_3$ filled LDPE films.

DESCRIPTION OF THE PRIOR ART

In U.S. Pat. No. 3,992,558 there is disclosed a process for coating fine particulate matter with high polymers using a fluid energy (jet) mill. The resultant coated particles are wettable and dispersible in coatings or polymeric materials. Insofar as is now known, it has not been proposed to form biaxially oriented thin films of $CaCO_3$ encapsulated LDPE.

Conventional dry-blended or Banbury mixed fine size fillers give poor dispersions and poor film drawdown with high concentrations of fillers in the order of 30–60%.

SUMMARY OF THE INVENTION

This invention provides thin, biaxially oriented films of low-density polyethylene filled with between about 30 weight percent and about 60 weight percent calcium carbonate, wherein said films are produced from calcium carbonate encapsulated in low density polyethylene.

DESCRIPTION OF SPECIFIC EMBODIMENTS

The low density polyethylene (LDPE) utilizable in this invention is made by the so-called high pressure method and has a density from about 0.910 to about 0.925. LDPE is readily available commercially. The $CaCO_3$ used has a particle size below 20 microns and is commercially available.

When attempts have been made to incorporate finely-divided $CaCO_3$ by conventional means into LDPE, the amount utilizable has been relatively low, generally below 20 weight percent. Efforts to incorporate larger amounts of $CaCO_3$ i.e., about 30–60 weight percent, have been unsuccessful, because of agglomeration, poor dispersion, and poor film drawdown. Generally, at about 20 weight percent $CaCO_3$ incorporated by dry blending or Banbury mixing, thin films can not be extruded with good properties.

It is the discovery of this invention that fine particles of $CaCO_3$ encapsulated in (coated with) LDPE, at $CaCO_3$ loadings of between about 30 weight percent and about 60 weight percent, can be extruded to form thin biaxially oriented films with good properties. As compared with unfilled LDPE, the films show an increase in modulus and a decrease in elongation with increased $CaCO_3$ loading. As expected, yield, break, and tear strengths are reduced with increased loading.

Encapsulation of the finely-divided $CaCO_3$ with LDPE is accomplished in a fluid energy mill, as described in U.S. Pat. No. 3,992,558, which is incorporated herein by reference. The components for the encapsulation can be fed to the fluid energy mill shown in the Drawing by feeding the dry, finely-dividedd $CaCO_3$ via the rotary valve feeder or the venturi feeder using an air assist and feeding the LDPE in 15 to 25 percent solution in aromatic hydrocarbon, such as xylene or toluene, with hot air assist. The hot air assist should be at a temperature (120° to 150° C.) and pressure (90 to 100 psi) sufficient to atomize the LDPE solution entering the fluid energy mill.

A preferred method is to feed a slurry of LDPE solution in aromatic hydrocarbon (e.g., toluene, xylene) with finely divided $CaCO_3$. The slurry is prepared outside the fluid energy mill in suitable high speed mixing equipment, such as a jacketed mixing kettle.

The slurry is fed into the fluid energy mill through the slurry feeder pump at 80° to 90° C., using a hot air assist at temperature (120° to 150° C.) and pressure (90 to 100 psig,) sufficient to atomize the slurry.

In operation, air at high velocity is introduced into the fluid energy mill via the manifold through the nozzles. The nozzles are directed to provide a cyclical flow of air within the mill, which transports the LDPE solution and $CaCO_3$ within the mill. As a result of the centrifugal motion that is set up, the fine particles of $CaCO_3$ encapsulated with LDPE migrate toward the center and are discharged through the classifier outlet and collected. The larger agglomerated particles migrate to the outer inside walls of the fluid energy mill and are recycled through the drier chamber, until by repeated collisions with the walls during the cyclic movement these particles are reduced in size and are discharged through the classifier outlet and collected.

EXAMPLE

In a steam jacketed mixer, portions of a 20 weight percent solution of LDPE (density=0.918; MI=2.0) in toluene were slurried with finely-divided $CaCO_3$ (2.5 microns avg.). The amount of $CaCO_3$ slurried in the portion was sufficient to provide 61 weight percent $CaCO_3$, based upon total LDPE+$CaCO_3$. The portion was passed through the fluid energy mill. The conditions used were; slurry inlet temperature 82° C., 100 psig.; drier manifold and nozzle air input 1200 cu.ft./min., 7° C.,; atomization temperature 146° C., 95 psig.; drier outlet temperature 79° C.; outlet encapsulated particles were fibrous and fluffy.

For loadings below 61 weight percent $CaCO_3$ the encapsulated particles were diluted with virgin LDPE and blown into biaxially oriented films on conventional tubular film extrusion equipment. The properties of each film are set forth in the Table in comparison to unloaded LDPE control.

TABLE

|  |  | % CaCO₃ |  |  | LDPE CONTROL |
|---|---|---|---|---|---|
|  |  | 61 | 43 | 32 |  |
| Film Thickness, mils |  | 2.0–3.0 | 1.8–3.0 | 1.5–3.0 | 2.0–2.5 |
| Modulus, psi. × 10³ | MD | 59.8 | 39.9 | 30.0 | 20.2 |
|  | TD | 57.7 | 32.8 | 27.7 | 20.8 |
| Yield Strength, psi. × 10³ | MD | None | 1.4 | 1.4 | 1.6 |
|  | TD | None | 1.3 | 1.3 | 1.3 |
| Break Strength, psi. × 10³ | MD | 0.5 | 1.3 | 1.3 | 2.6 |
|  | TD | 0.2 | 1.2 | 1.2 | 2.9 |
| Elongation, % | MD | 9 | 39 | 210 | 496 |
|  | TD | 6 | 36 | 52 | 618 |
| Elmendorf Tear, g./mil. | MD | 8 | 33 | 121 | 45 |
|  | TD | 8 | 34 | 117 | 75 |
| Haze, % |  | 67 | 81 | 84 | 12 |
| Gloss, % |  | 2 | 2 | 3 | 46 |
| Handle-O-Meter Rigidity, g./cm. | MD | 3.0 | 1.3 | 1.4 | 9.2 |
|  | TD | 3.3 | 1.3 | 1.7 | 12.3 |

From the data in the Table, it will be noted that all the CaCO$_3$ loaded films show an increase in modulus and a decrease in elongation as a function of loading. The handling or machinability properties appear to be improved over unfilled LDPE film. It appears that the 32% CaCO$_3$ level offers the best balance of film properties. It has a paper-like feel and translucent properties. In other extrusion trials, drawdown to as low as 0.4 mil. film could be effected.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. Thin, biaxially oriented films of low-density polyethylene, having a thickness between 0.4 mil and about 3 mils, filled with between about 30 weight percent and about 60 weight percent calcium carbonate, wherein said films are produced from calcium carbonate having a particle size below 20 microns encapsulated in low density polyethylene.

* * * * *